(12) United States Patent  (10) Patent No.: US 7,059,953 B2
Jensen et al.  (45) Date of Patent: Jun. 13, 2006

(54) APPARATUS AND A METHOD FOR AUTOMATIC CUTTING OF ORGANS FROM A PLUCKS SET FROM A CARCASS

(75) Inventors: Carsten Jensen, Roskilde (DK); Niels R. Jensen, Hellerup (DK); Bjarne Vestergaard-Jensen, Ishøj (DK)

(73) Assignee: Slagteriernes Forskningsinstitut, Roskilde (DK)

( * ) Notice: Subject to any disclaimer, the term of this patent is extended or adjusted under 35 U.S.C. 154(b) by 193 days.

(21) Appl. No.: 10/600,591

(22) Filed: Jun. 23, 2003

(65) Prior Publication Data

US 2004/0029513 A1  Feb. 12, 2004

(30) Foreign Application Priority Data

Jun. 26, 2002 (DK) ............................... 2002 00983

(51) Int. Cl.
*A22B 5/18* (2006.01)
(52) U.S. Cl. .................................................... 452/117
(58) Field of Classification Search ................ 452/117, 452/106, 177, 198
See application file for complete search history.

(56) References Cited

U.S. PATENT DOCUMENTS 5,186,678 A * 2/1993 Conner et al. .............. 452/106
5,318,428 A * 6/1994 Meyn ......................... 452/106
5,549,521 A * 8/1996 van den Nieuwelaar et al. 452/118
6,638,155 B1 * 10/2003 Jensen et al. ................ 452/117
2003/0148725 A1  8/2003 Jensen et al.

FOREIGN PATENT DOCUMENTS

| EP | 0 439 904 A1 | 8/1991 |
| EP | 0 482 700 A1 | 4/1992 |
| EP | 0 541 150 A1 | 5/1993 |
| EP | 0 679 336 A1 | 11/1995 |
| EP | 1 188 381 A1 | 3/2002 |
| GB | 2 004 175 A | 3/1979 |
| WO | WO 00/33661 | 6/2000 |

OTHER PUBLICATIONS

European Search Report.

* cited by examiner

*Primary Examiner*—Thomas Price
(74) *Attorney, Agent, or Firm*—Sughrue Mion, PLLC

(57) ABSTRACT

An apparatus for automatic cutting of organs from a plucks set from a carcass by a cutting device, the plucks set comprising larynx, gullet and windpipe, lungs and heart. The apparatus comprises a suspension device for holding the pipes, moving device for moving the plucks set relative to the cutting device, while the pipes are held in the suspension device, and a guiding device adapted to guide the plucks set to the cutting deice and keep the lungs and the heart separated from each other.

20 Claims, 6 Drawing Sheets

APPARATUS AND A METHOD FOR AUTOMATIC CUTTING OF ORGANS FROM A PLUCKS SET FROM A CARCASS

CROSS-REFERENCE TO RELATED APPLICATIONS

The present application claims the benefit of priority from Danish Patent Application No. PA 2002 00983 filed on Jun. 26, 2002.

BACKGROUND OF THE INVENTION

The present invention relates to processing a part of a plucks set from a carcass of e.g. a pig, said part of a plucks set comprising the gullet and windpipe, referred to as "the pipes", the larynx, the heart and the lungs, i.e. said part of a plucks set is the so-called "heart plucks set".

Thus the present invention relates to an apparatus for automatic cutting of organs from a plucks set from a carcass by means of cutting means, said plucks set comprising larynx, gullet and windpipe, lungs and heart. Moreover, the invention relates to a method for automatic cutting of organs from a heart plucks set from a carcass.

An apparatus of this type is known from our Danish patent application PA 2000 01499, which describes an apparatus, in which three circular cutting means are mounted with their respective centres in each their respective corner of a predetermined triangle. The cutting means may be moved outwards to give room for the introduction of a plucks set in the space present between them. When the cutting means are taken back and the plucks set is pulled up through the space, the cutting means will cut off the two lungs and the heart, so that only the larynx and the pipes are left on the suspension means.

This known apparatus functions satisfactorily as long as the plucks set is complete, i.e. when it has two lungs and a heart, which are complete. By a satisfactory cutting is to be understood that the organs are not deteriorated, and that the cut is positioned so precisely that heart fat and the bronchial tubes are not cut off together with the organs, but remain on the pipes. In practice, it does, however, often occur that the heart during the slaughtering process has been cut open by a veterinary with a view to controlling for diseases, that bigger or smaller pieces of one or both lungs are missing or that the plucks set is damaged in another way.

BRIEF SUMMARY OF THE INVENTION

It is therefore the object of the invention to provide an apparatus for automatic separation of organs from a heart plucks set, said apparatus providing a satisfactory cutting even though deformations or insufficiencies of one or more of the organs may occur.

The object is met by an apparatus according to the invention comprising a suspension means for holding the pipes, moving means for moving the plucks set relative to the cutting means, while the pipes are held in the suspension means, and a guiding means adapted to guide the plucks set relative to the cutting means and to keep lungs and heart separated from each other.

This apparatus provides a secure cutting, as the suspension and moving means take care of advancing the plucks set to the cutting means, while the guiding means keeps lungs and heart apart thereby preventing a cutting means, which is designed with a view to cutting for instance the heart, from cutting the lungs. Moreover, the guiding means serves the purpose of guiding and positioning the various parts of the plucks set.

In a preferred embodiment the guiding means is divided in two parts and has an upper side, on which the lungs may rest, and a slit between the two parts having such a width that the connection of the heart to the rest of the plucks set may extend through the slit, whereas passage of the lungs is not allowed. In this way the heart is made to be suspended on the under side of the guiding means influenced by the gravitational effect and is thus kept separated from the lungs. The heart may, in principle, hang freely, but if the slit in the guiding means is so big that there is a risk of the lungs being pulled down through it, special guiding members for supporting and guiding of the heart may be provided below the guiding means.

To prevent the lungs from blocking or being stuck in the slit between the two plate parts it is furthermore preferred that on the two parts of the guiding means, members are provided, which force the lungs outwards and away from the slit between the two parts. These members may comprise profiles or bodies on the guiding means itself or separate parts, like for instance guiding plates provided above the guiding means.

When a guiding means of the type described above is used, the cutting may advantageously be carried out by providing a cutting means at the upper side of the guiding means on each side of the slit between the two parts of the guiding means, and by providing a third cutting means at the slit below or above the slit. The two cutting means at the upper side of the guiding means serve the purpose of cutting off the lungs, while the third one cuts off the heart. The three cutting means may be positioned close to one another or may be spaced in the transport direction of the plucks set, depending on where and how the cut off organs are to be collected and/or transported away from the apparatus.

The guiding means serves primarily the purpose of guiding the plucks set to the cutting means and is therefore designed particularly for that purpose. This may, however, entail problems at the beginning of the guiding means, where the plucks set is to be guided onto the guiding means, so that heart and lungs are made to lie/hang properly. To ensure that this introduction takes place as unproblematic as possible the apparatus according to the invention is in a particularly advantageous embodiment characterized in comprising before the guiding means a separation device for separating heart and lungs. This separation device is exclusively used for separating heart and lungs and may thus be designed with a view to this particular function, whereby a very secure function of the device is attained.

In a preferred embodiment the separation device comprises a flat engagement means extending upwards. In this embodiment the plucks set may be lowered or slid down over the engagement means, which means that heart and lungs are separated in a particularly effective manner. The engagement means has to be flat, but not necessarily plane, such that it is suited to move up between lungs and heart. The engagement means may thus be curved or be provided with thickenings, recesses and the like without exceeding the scope of protection.

In a more preferred embodiment the engagement means in a first position stands up relative to horizontal under an angle of at least 45°, preferably at least 60°, more preferred 80–90°, and in a second position the engagement means lies down under an angle of at the most 30°, preferably at the most 20°, more preferred 0–15°. In this way the above-mentioned effective separation is on one hand obtained and on the other hand the plucks set is, when put down in the second position, made to lie in a lying position with the lung resting on the upper side of the engagement means. This lying position is advantageous, as, contrary to a hanging position, it becomes possible to exploit the gravitational effect for keeping the heart away from the lungs. From this position it is, therefore, particularly easy to transfer the plucks set to the guiding means.

In a particularly advantageous embodiment the separation comprises a bed with a recess allowing the heart to pass through. Also in case of such a bed the separation just mentioned above is obtained by the gravitational effect, the heart being able in the second position of the engagement means to fall through the recess, while the lighter and area-wise bigger lungs will remain lying on the upper side. Such a bed may also be used without the engagement means, but the plucks set then has to be brought into a lying position in another way.

The plucks sets have by nature comparatively big variations as to dimension and weight of the individual parts. To ensure that the engagement means can be used in spite of such variations, it is preferred that the bed comprises resilient means having such a rigidity and density that they bend aside under the weight of the heart, but are able to carry the lungs. In this way the light lungs will remain lying on the upper side of the resilient means, even though they may be so small that they would otherwise fall through the recess, and the heart will, on account of its weight, force the resilient means aside.

If the resilient means cover the entire recess, the friction between the resilient means and particularly big hearts will become comparatively big, and it is therefore preferred that the resilient means are arranged only along the edge of the recess. In this manner, small hearts will pass completely without influencing the resilient means, and the influence from big hearts will become smaller.

When the plucks set is to be transferred from the separation device to the guiding means, it is advantageous that the distance between these two parts is as small as possible. This short distance may, however, be a drawback if there is to be room for moving an engagement means between an upright and a lying position. It is therefore preferred that the separation device is movable between a receiving position and a supplying position, the separation device being, when in the supplying position, in contact with or positioned close to the guiding means. The moving of the separation device will, moreover, in certain embodiments be able to actively contribute to the separation of heart and lungs, the movement being usable for introducing the engagement means between heart and lungs.

In a preferred embodiment the apparatus comprises an orientation device adapted to orientate the plucks set so that the heart gets a predetermined orientation. Such an orientation device has the effect that all the plucks sets are made to hang in the same manner, which is advantageous as the separation of heart and lungs and the conveyance to the cutting means are facilitated.

Orientation of the plucks set may, in principle, be carried out by means of any desired means, but in a preferred embodiment of the invention the orientation device comprises means for detecting the orientation of the larynx in a horizontal plane and means for turning the larynx to the predetermined orientation, if that orientation is not detected at the detection. The reason why exactly this embodiment is considered advantageous is that the larynx contains cartilage parts, which makes the detection of its orientation easy, as it contains a pronounced horseshoe-shaped cartilage part appearing distinctly as a white delineation against the red tissue. Consequently, both a mechanical and an optical identification are possible.

A particularly advantageous embodiment of the suspension means is one, in which it comprises two suspension members spaced mutually to such a degree that the pipes, but not the larynx, may pass between them. By use of such a suspension means the pipes at the plucks set may be introduced between the two suspension members, and as the distance is only just so big that the pipes can pass, the somewhat bigger and comparatively solid larynx will remain hanging on the upper side of the suspension members. In this manner, an easy and safe suspension is attained.

In a preferred embodiment the suspension means extend substantially through the entire apparatus. The suspension members may in this embodiment advantageously be two rods or tubes extending in parallel, and the plucks sets may then be conveyed through the apparatus in a continuous or substantially continuous movement. It will furthermore be ensured that the order of the plucks sets is not changed, which might for instance be an advantage, if a set has to be traced back to the carcass, from where it has been derived.

To ensure an even and reliable conveying of the plucks sets it is preferred that the moving means comprise a pusher adapted for movement along the suspension members. If the suspension members are rods designed with a suitable inclination, the conveying of the plucks sets, which are normally moist and consequently comparatively slippery, could, however, also take place by means of the gravitational effect.

If the apparatus is only used for the cutting of plucks sets from a single slaughter line, the interval, at which the plucks sets arrive to the apparatus, will normally be sufficiently big. If, however, a co-ordination of plucks sets from several slaughter lines takes place, it will be advantageous that the apparatus is provided with a buffer device positioned before the cutting means, preferably before the separation device, more preferred before the orientation device. This buffer device may for instance be designed as a storing magazine receiving the plucks sets as they arrive and then handing them over one by one at a predetermined time interval.

Another aspect of the invention is a method for automatic cutting of organs from a plucks set.

BRIEF DESCRIPTION OF THE SEVERAL VIEWS OF THE DRAWING

Examples of the invention will now be explained below with reference to the very schematical drawings, in which.

DETAILED DESCRIPTION OF THE INVENTION

Figure 1:
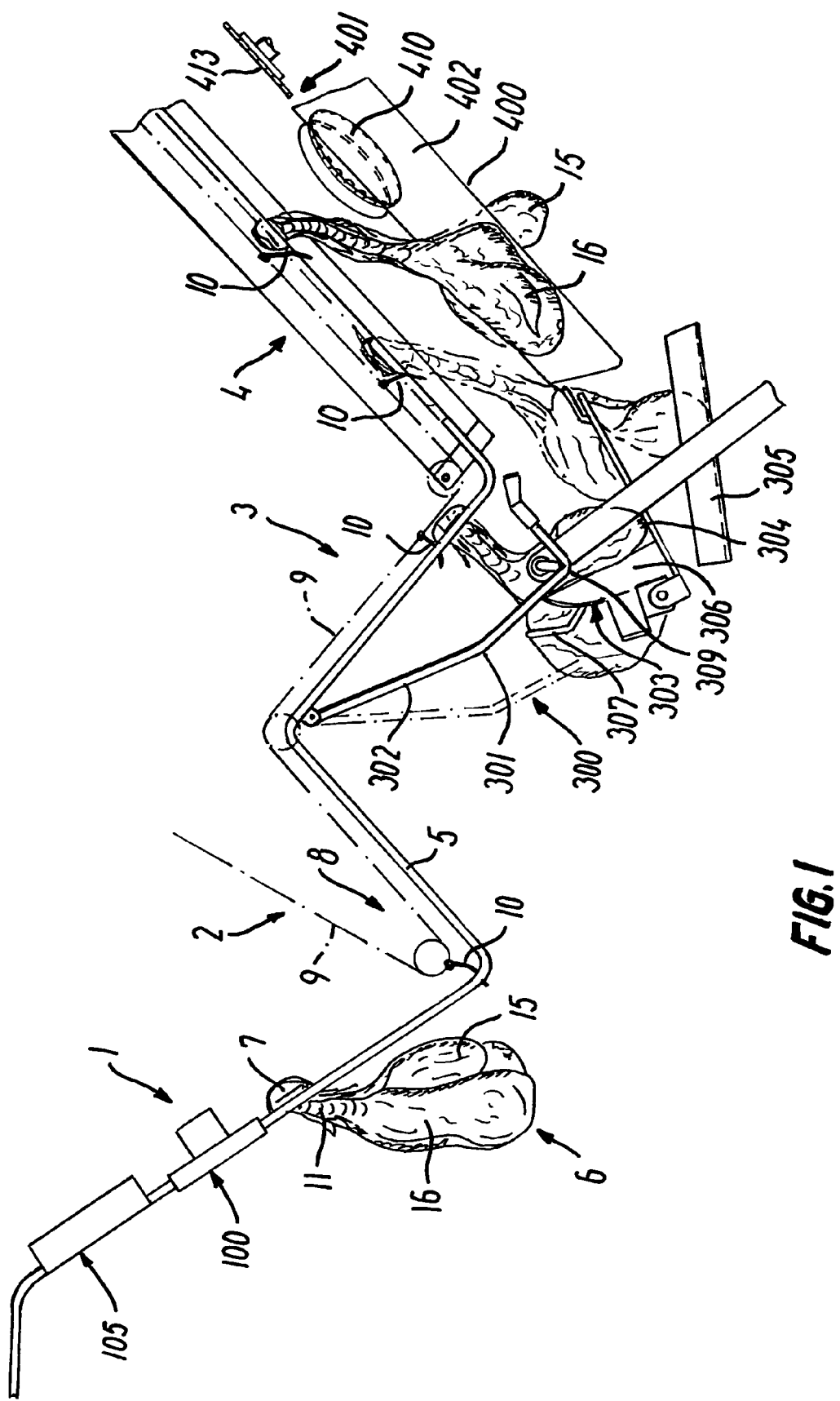
FIG. 1 shows the apparatus according to the invention in a preferred embodiment, seen from the side.

From FIG. 1 will be seen that the apparatus according to the invention has the overall shape of a W, in which the four arms of the W correspond to four functional zones in the apparatus. The first arm 1, furthest to the left in FIG. 1, constitutes a receiving zone, the second arm 2 a resting zone, the third arm a separation zone 3 and the fourth arm 4 a cutting zone. In the following, elements belonging to the receiving zone will be designated by reference numerals in the interval of 100–199, elements in the resting zone with reference numerals in the interval of 200–299, etc.

Through the entire apparatus a pair of rods 5a, 5b extends, said rods serving as suspension members, on which the individual plucks sets 6 are suspended at the larynx 7. This continuous suspension means 5 ensures that the order, in which the plucks sets arrive to the apparatus, remains unchanged during the whole process, and moreover minimizes the risk of plucks sets falling out of the apparatus or getting stuck at a transition between the various elements. Along part of the suspension means 5, like for instance in the receiving zone 1, the plucks set 6 is moved forwards in the apparatus exclusively by means of the gravitational effect, whereas in others, like for instance the resting zone 2, a moving means 8 is provided, here in the form of a chain 8a with fingers 9 pushing the plucks set forwards along the suspension means 5. The moving means 8,9 may also work over bigger or smaller parts of the apparatus, and it may be designed in other ways. An embodiment might for instance be imagined, in which the moving means 8,9 is provided in connection with the suspension means 5, for instance by the chain 8 running inside a tube constituting one of the suspension members 5a, 5b.

The suspension of the plucks set 6 in the larynx 7 is particularly advantageous, the larynx being the only part of the plucks set, where no significant differences of size exist. An example of a larynx is seen FIG. 2, from which will be seen that the larynx is comparatively voluminous compared to the associated gullet and windpipe 11. This means that the larynx 7 can remain hanging on the upper side of the suspension means 5a, 5b, while the tubes 11 pass between them. At the under side the larynx 7 has an oval shape. This shape means that the larynx will always be hanging in such a manner that the biggest diameter of the oval is in parallel with the longitudinal axis of the suspension means 5, i.e. it takes up one of two possible positions. If the larynx is placed having another orientation, the weight of the plucks set will cause the larynx to be pulled in place in the above-mentioned position.

Figure 2:
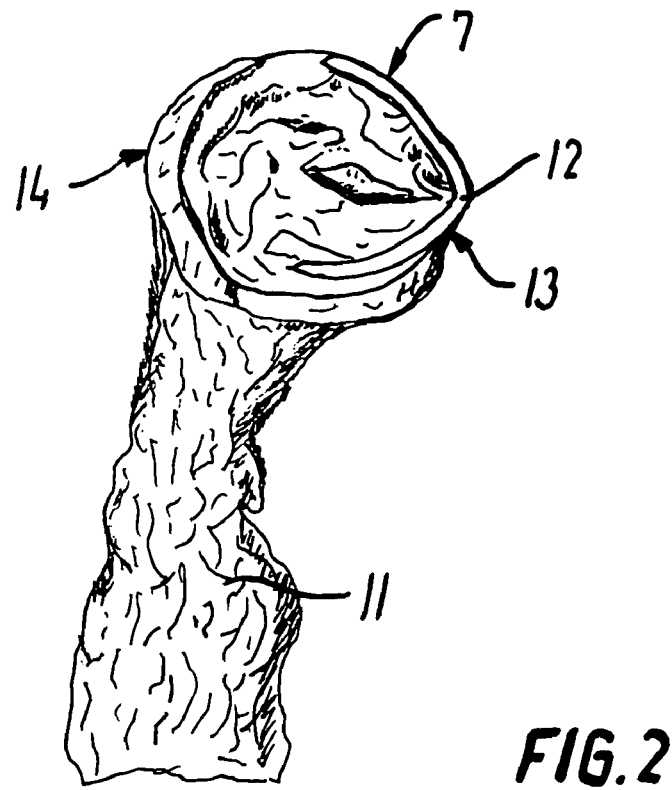
FIG. 2 a larynx seen in perspective with a part of the associated gullet and windpipe.

From FIG. 2 it is furthermore seen that the larynx has a markedly horseshoe-shaped cartilage part 12. This cartilage part is comparatively rigid relative to the rest of the larynx 7, and the larynx has thus two markedly different sides, one side 13 of which is rigid, whereas the other side 14 is resilient. Exactly this property may, as will be explained in detail below, be used for orientation of the plucks set 6, the two sides 13, 14 of the larynx 7 being discernible from one another.

On account of the subsequent separation and cutting of the plucks set, it is in the embodiment advantageous that the heart faces forward, seen in the transport direction, when the plucks set reaches the separation zone 3. This corresponds to the cartilage part 12 of the larynx facing forwards. This orientation may for instance be obtained by means of an orientation device 100 like the one illustrated in FIGS. 3a and 3b.

Figure 3A:
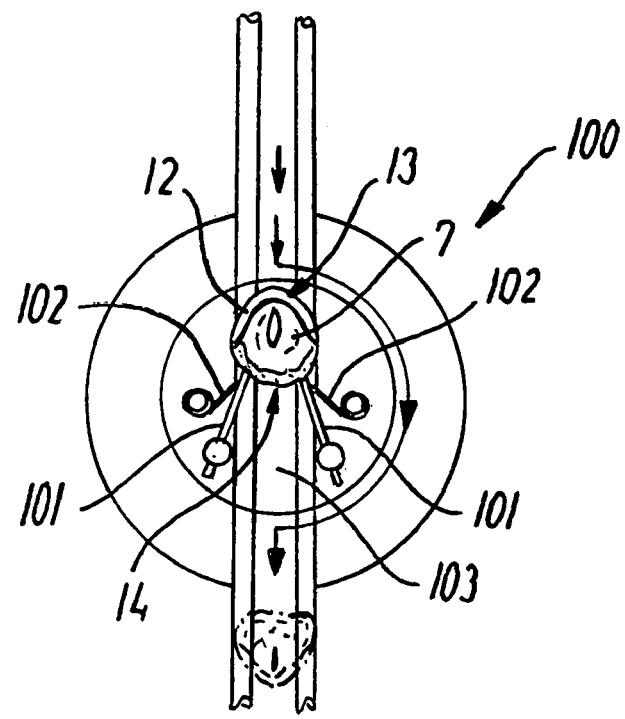
FIGS. 3a and 3b an orientation device, the larynx being shown in the two possible positions.

FIG. 3a shows the situation, in which the cartilage part 12 of the larynx faces backwards relative to the transport direction. The orientation device 100 has two arms 101, which by means of springs 102 are kept pointing inwards towards a slit 103. When the resilient side 14 of the larynx 7, like here, faces the transport direction, the ends of the two arms will as illustrated penetrate slightly into the larynx, thus preventing it from passing. When the larynx has thus been caught, the orientation device will be turned 18020 as indicated by the arrows, following which the plucks set is also turned, and the arms now facing in the transport direction will no longer hold the plucks set, which may thus move on in the apparatus.

To allow turning of the orientation device the suspension members 5a, 5b are discontinued at the orientation device. The suspension means 5 may, however, still be considered as being continuous, the slit 103 in the orientation device acting as an extension thereof.

Figure 3B:
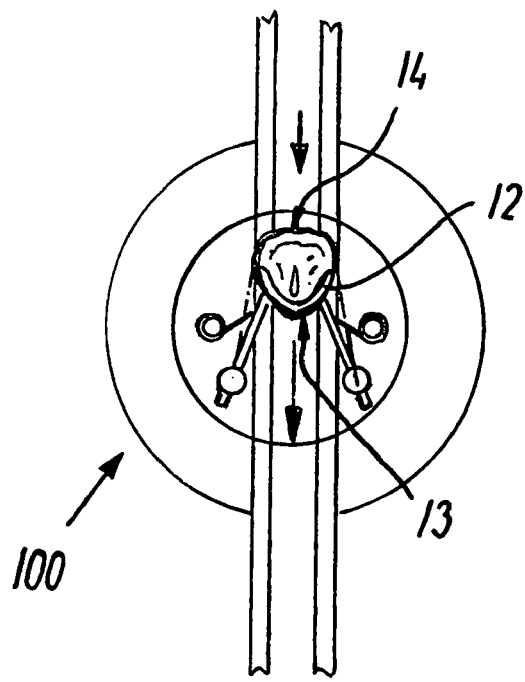

FIG. 3b shows the situation, in which the larynx has the desired orientation, the cartilage part 12 facing the transport direction. On account of the rigidity of the cartilage part, the arms 101 will not here be able to penetrate into the larynx, but will instead be forced aside by the tapering larynx against the force from the springs 102, following which the plucks set may pass comparatively unhindered.

In an alternative embodiment, the orientation device 100 may be made as an optically based system, in which the orientation of the larynx is determined on basis of the position of the white cartilage part 12 in the reddish tissue.

To prevent two plucks sets from arriving simultaneously or at a very short interval to the orientation device, it is preferred to provide the apparatus according to the invention with a buffer device 105 receiving the plucks sets as they arrive to the apparatus and releasing them at a predetermined rate. Such buffer devices may be designed and work in countless manners, but these embodiments will not be described in detail, as they will be well known to the person skilled in the art. It is, however, preferred to provide the buffer device with an emergency shutdown, by means of which the release of plucks sets from the buffer device may be stopped for a shorter or longer period of time.

Figure 4:
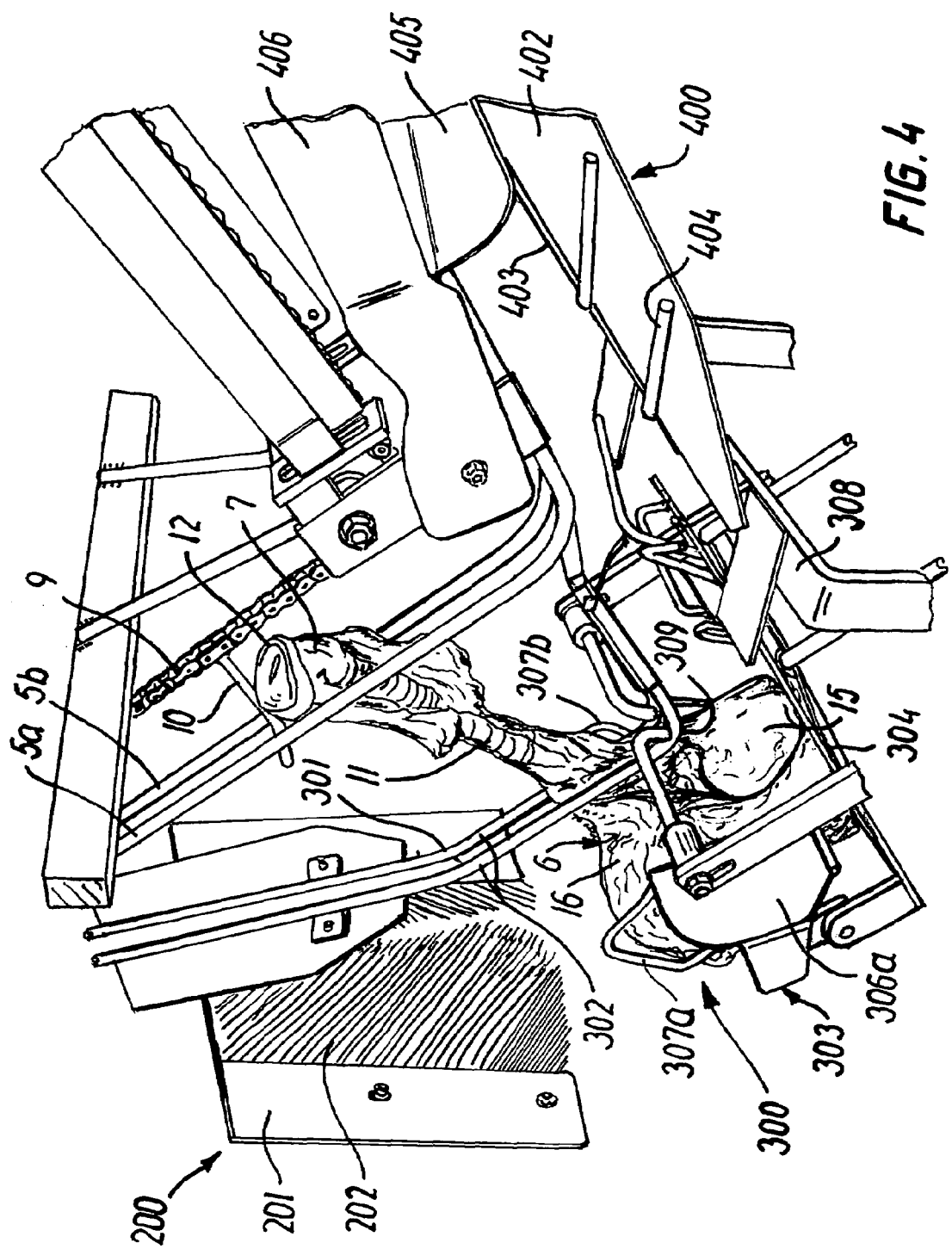
FIG. 4 a separation device seen askew from above in perspective as built into the apparatus.

In the embodiment shown, the now orientated plucks sets 6 are conveyed to a resting zone 2, where they are allowed to hang freely to put a stop to swings, if any, and to allow twists of the gullet and windpipe to straighten out to bring the heart foremost in the transport direction. The resting zone 2 may comprise particular devices, which are intended to bring the plucks set to rest by letting it get into abutment against said devices. An example of such a device 200 is shown in FIG. 4. Here, the device comprises a plate 201 having a recess, bristles 202 being provided along the edge of the recess and giving a certain resistance, when the plucks set passes through the recess. The plucks set may also be brought into abutment against such a plate and subsequently be pulled away along the plane of the plate.

In the embodiment shown in FIG. 1, the resting zone 2 has a certain extension, but embodiments may also be imagined, in which the resting zone only consists of a plate 202 with bristles, like the one just mentioned, or in which it is completely omitted.

When the plucks set 6 has thus been orientated and is hanging down quietly from the suspension means 5, a separation of heart 15 and lungs 16 is made in order to facilitate the cutting. FIG. 4 shows a separation device adapted to perform said separation, which is not to be mistaken for the cutting itself.

From FIG. 1 will be seen that the separation device is built up as a pivotal arm 300 secured to pivot about a point close to the suspension means 5, such that the plucks set 6, when it gets into the separation zone 3, will be hanging with the larynx 7 on the upper side of the suspension means 5 and heart 15 and lungs 16 on the under side of the arm 300, which, as will appear from FIG. 4, consists of two rods 302 extending in parallel and thus has substantially the same design as the suspension means 5. The arm 300 hangs down freely from the pivot point in such a manner that the distance between the arm and the suspension means 5 increases by the distance from the pivot point. At a distance from the pivot point the arm has a bend 301 having the effect that the lower end of the arm is turned slightly towards the suspension means 5.

When the plucks set 6 arrives in the separation zone 3, the gravitational effect will cause it to slide down along the arm 300 and the suspension means 5, until the distance between the arm and the suspension means gets so big that the gullet and windpipe 11 are completely straightened. Here, the plucks set will remain hanging until a finger 9 of the moving means 8 forces it to move on. The pull on the tubes 11 will then cause the arm 300 to tilt upwards towards the suspension means, at least until the lower part of the tubes 11 passes the bend 301.

On the lower end of the arm 300 the separation device proper is positioned. The separation device comprises in principle three different parts, viz. an engagement means 303 contributing to an initial separation of heart 15 and lungs 16, a bed 304 for a secondary separation and a guide plate 305 carrying the heart 15 after the separation.

When the plucks set has passed the bend 301 on the arm, the heart 15 and the lungs 16 will get in contact with the engagement means 303 designed with such an angle relative to the arm 300 that it hits the front side (seen in the transport direction) of the lungs. In the embodiment shown, the engagement means consists of two plate members 306, two bows 307 being welded onto each plate member. In FIG. 4 only one of the two plates 306a is visible, whereas the bow 307b on the second plate can be seen faintly behind the plucks set 6. The plates 306 are here in contact with the sides of each of the lungs 16, so that the lungs are retained, while the space between the plates allows the heart 15 to hang by and large freely.

The arm 300 may also be provided with vibration devices 312, which may be used for shaking the plucks set 6 in place around the engagement means 303.

In principle, the separation thus performed might be sufficient for giving a satisfactory cutting, but to ensure that also damaged plucks sets are separated properly, also a secondary separation is performed in the embodiment shown.

By the continued conveyance of the larynx 7 along the suspension means 5, the separation device gets into abutment against a support member 308 and can thus not tilt any further. When this happen, the pull in the tubes 11 will instead cause a turning of the engagement means 303 about a point near the upper side of the bed, until the lower part of the tubes 11 passes another bend 309 on the arm 300. When this happens, the engagement means 303 will be positioned in parallel with the bed 304.

Figure 5:
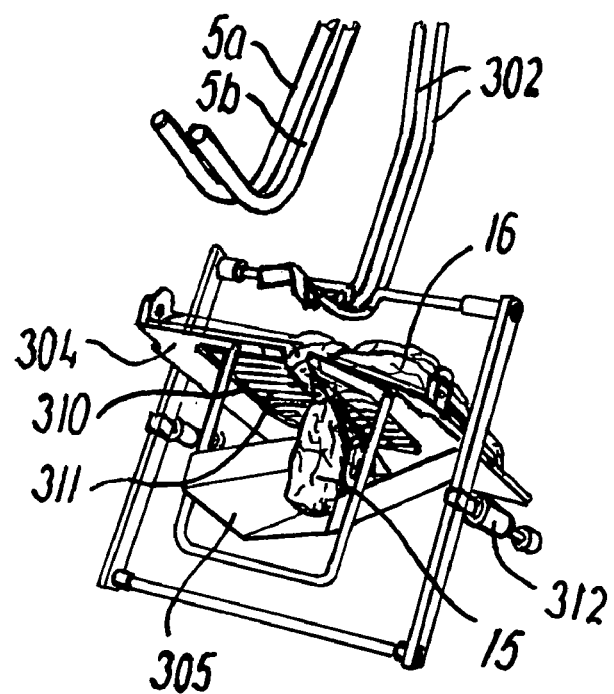
FIG. 5 the separation device in FIG. 4, seen askew from below.

The bed 304 has a recess 310, which will best be seen in FIG. 5. This recess 310 is provided with bristles 311 just like the recess in the plate 201 in the resting zone 2. As the engagement means 303 is turned, the heart 15 will gradually get closer to the recess 310 and finally fall through it, as the bristles 311 are not sufficiently rigid for carrying it. On the other hand, the lungs 16 will, if one or both or parts thereof have got on the wrong side of the engagement means 303, not be able to pass the bristles 311, as the density of the lungs is too small to force them aside.

Under the bed 304 a gull-shaped guide plate 305 is provided, in which the heart 15 ends, when it has passed the bed 304. This guide plate prevents the heart from hanging down freely, as the weight of the heart may be sufficient for pulling the lungs down through the bristles 311.

Figure 6:
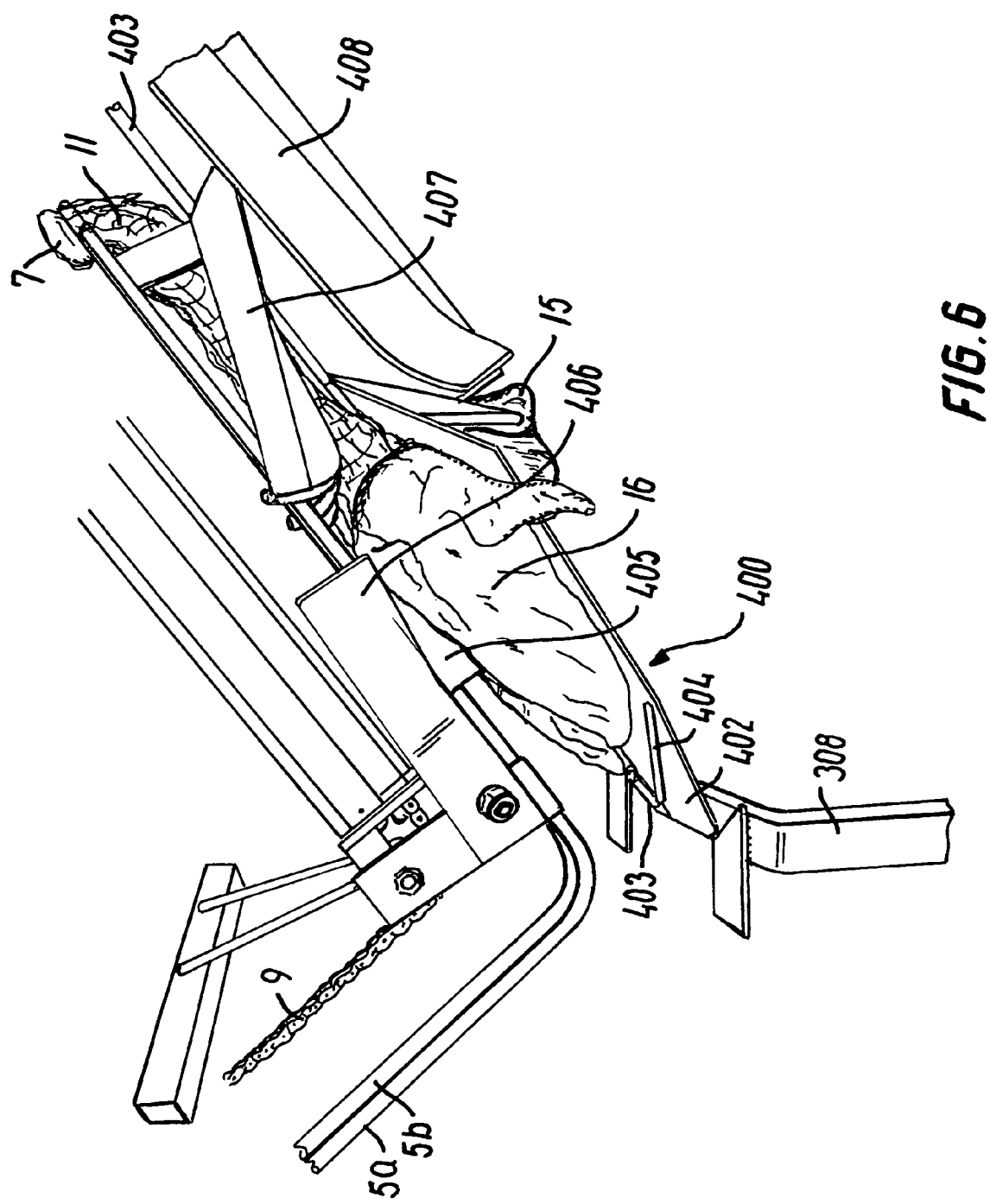
FIG. 6 a lower part of the guiding means seen in perspective.

When the plucks set 6 has been separated in the separation device, it is transferred to a guiding means 400 in the cutting zone 4. The guiding means comprises in the embodiment shown two plate members 402 separated by a slit 403 and angled relative to one another in such a manner that their highest position is closest to the slit. By the transfer of the plucks set, the lungs 16 are removed from the upper side of the plate members 306 of the engagement means to the upper side of the plate members 402 of the guiding means, while the heart, which hangs down through the recess in the bed 304, is brought in below the plate members 402, as shown in FIG. 6. To make this transfer possible, the recess of the bed 304 is open towards the guide means 400.

The primary function of the guiding means is to guide the plucks set to the cutting means 401, but it also serves the purpose of positioning and separating heart 15 and lungs 16. This positioning takes place due to the fact that the heart 15 is now hanging down freely under the slit 403 and thereby kept in place on account of the gravitational effect, whereas the lungs 16 are forced outwards away from the slit 403, partly due the fact that the two plate members 402, on which the rest, tilt downwards away from slit, partly by means of control members 404 mounted on the plate members 402. The plate members 402 of the guiding means are not resilient like the bristles on the bed 304, and the slit 403 is only just wide enough to allow passage of the connection of the heart with the rest of the plucks set. This helps in preventing the lungs 16 from being pulled down through the slit on account of the weight of the freely hanging heart 15. However, also types of embodiments may be conceived, in which special conveying means for supporting and guiding the heart under the guide means are provided corresponding to the gully 305 of the separation device. However, also the opposite solution might be conceived, in which the heart is conveyed on the upper side and the lungs on the under side.

In the embodiment shown, the guide means 400 is moreover provided with guide plates 405 for forcing the lungs 16 away from the slit 403 and onto the plate members 402 immediately after the transfer of the plucks set 6 to the guiding means, as well as other guide plates 406, 407, 408, 409 for maintaining the orientation of the parts of the plucks set relative to one another.

Figure 7:
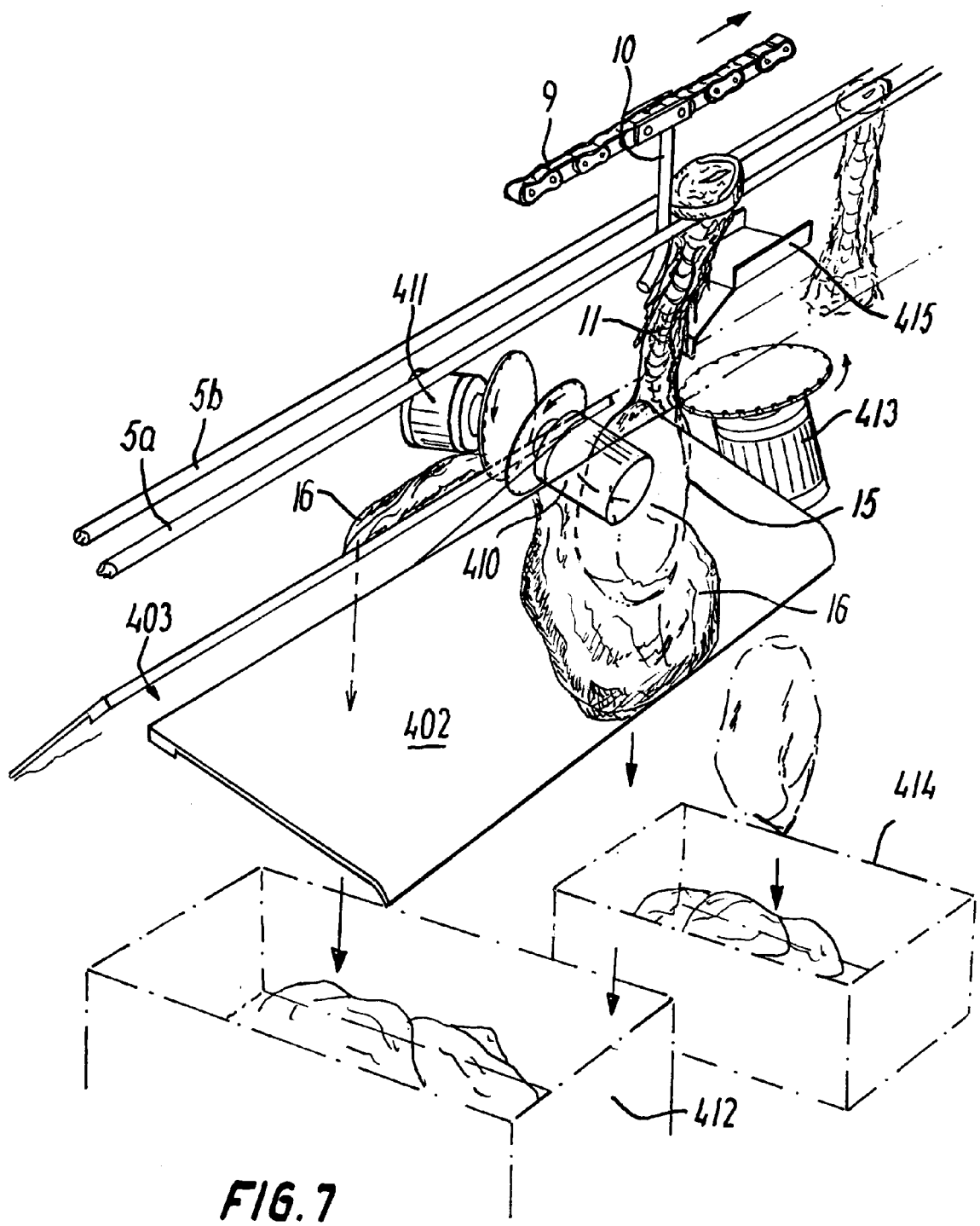
FIG. 7 the guiding means and the cutting means in a highly schematic, perspective view.

FIG. 7 shows the position of the cutting means relative to the guiding means 400 and the suspension means 5, by means of which the plucks set 6 is still guided.

When the plucks set reaches the two first cutting means 410 and 411, here designed as circular knives, the lungs 16 are cut off and fall down in a collecting box 412 suited for that purpose and being positioned below the apparatus. This box 412 may also be integral with the apparatus. The two circular knives 410 and 411 are mounted in such a manner relative to the plate members 402 of the guiding means 400 that the cutting is performed under a nearly right angle relative thereto.

A third circular knife 413 is positioned on the under side of the guiding means 400 for cutting off of the heart 15 which falls down in another collecting box 414, which like the first one may be detachable or integral with the apparatus.

The larynx 7 and the pipes 11 are conveyed further forwards in the apparatus, where the distance between rods 5a, 5b of the suspension means is increased (not shown), such that the larynx falls down between them. In the embodiment shown a guide plate 415 is provided above the third cutting means 413 for preventing the gullet and windpipe 11 from colliding with the cutting means under or after the cutting off of the heart.

The lungs, heart and gullet and windpipe with larynx of the plucks set have thus been separated and the processing thereof consequently finished.

In the above a preferred embodiment of the invention has been described, but it should be understood that one or more of the individual elements of the apparatus could be dispensed with, just as it would be possible to position the elements in a different way relative to one another. It would, among others, be possible to dispense with the orientation device, and the resting zone might be completely or partly dispensed with, just as the buffer device might be arranged after the orientation device.

We claim:

1. An apparatus for automatic cutting of organs from a plucks set from a carcass by means of cutting means, said plucks set comprising larynx, gullet and windpipe, lungs and heart, said apparatus comprising a suspension means for holding the gullet and windpipe; said suspension means comprising two suspension members spaced mutually to such a degree that the gullet and windpipe, but not the larynx can pass between them; moving means for moving the plucks set relative to the cutting means, while the gullet and windpipe are held in the suspension means; and a guiding means adapted to guide the plucks set relative to the cutting means and to keep lungs and heart separated from each other.

2. An apparatus according to claim 1, wherein the guiding means is divided in two parts and has an upper side, on which the lungs may rest, and a slit between the two parts having such a width that a connection of the heart to a rest of the plucks set may extend through the slit, passage of the lungs being not allowed.

3. An apparatus according to claim 2, wherein at the two parts of the guiding means, members are provided which force the lungs outwards and away from the slit between the two parts.

4. An apparatus according to claim 2, wherein a cutting means is provided at the upper side of the guiding means on either side of the slit between the two parts of the guiding means, and a third cutting means is provided at the slit below or above the slit.

5. An apparatus according to claim 1, comprising, before the guiding means, a separation device for separating heart and lungs.

6. An apparatus according to claim 5, wherein the separation device comprises a flat engagement means extending upwards.

7. An apparatus according to claim 6, wherein the engagement means in a first position stands up relative to horizontal under an angle of at least 45°, and that the engagement means in a second position lies down under an angle of at the most 30°.

8. The apparatus according to claim 6, wherein the engagement means in a first position stands up relative to horizontal under an angle of at least 60°, and that the engagement means in a second position lies down under an angle of at the most 20°.

9. The apparatus according to claim 6, wherein the engagement means in a first position stands up relative to horizontal under an angle of 80–90°, and that the engagement means in a second position lies down under an angle of 0–15°.

10. An apparatus according to claim 5, wherein the separation device comprises a bed with a recess allowing the heart to pass through it.

11. An apparatus according to claim 10, wherein the bed comprises resilient means having such a rigidity and density that they bend aside under the weight of the heart, but are able to carry the lungs.

12. An apparatus according to claim 11, wherein the resilient means are arranged along an edge of the recess.

13. An apparatus according to claim 5, wherein the separation device is movable between a receiving position and a supplying position, the separation device being, when in the supplying position, positioned close to the guiding means.

14. An apparatus according to claim 1, comprising an orientation device adapted to orientate the plucks set, to give the heart a predetermined orientation.

15. An apparatus according to claim 14, wherein the orientation device comprises means for detecting an orientation of the larynx in a horizontal plane and means for turning the larynx to a predetermined orientation, if that predetermined orientation is not detected at the detection.

16. An apparatus according to claim 14, wherein the suspension members extend substantially through the entire apparatus.

17. An apparatus according to claim 14, wherein the moving means comprise a pusher adapted for movement along the suspension members.

18. An apparatus according to claim 1, wherein a buffer device is positioned before the cutting means.

19. The apparatus according to claim 1, wherein a buffer device is positioned before the separation device.

20. The apparatus according to claim 1, wherein a buffer device is positioned before the orientation device.

* * * * *